US009809144B2

(12) United States Patent
Clive-Smith

(10) Patent No.: US 9,809,144 B2
(45) Date of Patent: Nov. 7, 2017

(54) REMOVABLE FRAME SYSTEMS FOR VEHICLE SHIPPING

(71) Applicant: Martin Clive-Smith, Warwickshire (GB)

(72) Inventor: Martin Clive-Smith, Warwickshire (GB)

(*) Notice: Subject to any disclaimer, the term of this patent is extended or adjusted under 35 U.S.C. 154(b) by 0 days.

(21) Appl. No.: 14/930,569

(22) Filed: Nov. 2, 2015

(65) Prior Publication Data
US 2016/0137121 A1 May 19, 2016

(30) Foreign Application Priority Data

Nov. 19, 2014 (GB) .................................. 1420504.1

(51) Int. Cl.
*B60P 7/08* (2006.01)
*B60P 3/08* (2006.01)
*B60P 3/077* (2006.01)

(52) U.S. Cl.
CPC ................. *B60P 3/08* (2013.01); *B60P 3/077* (2013.01)

(58) Field of Classification Search
CPC .............. B60P 3/07; B60P 3/08; B60P 3/077
USPC .............. 410/4, 14, 16–18, 24–26, 29.1, 30; 211/191, 192, 208; 220/1.5; 414/498
See application file for complete search history.

(56) References Cited

U.S. PATENT DOCUMENTS

| 4,786,222 A | 11/1988 | Blodgett |
| 5,454,672 A * | 10/1995 | Halpin ...................... B60P 3/08 410/24 |

FOREIGN PATENT DOCUMENTS

| GB | 2072627 A | 10/1981 |
| GB | 2352700 A | 2/2001 |
| WO | 9421488 A1 | 9/1994 |
| WO | 2012022941 A1 | 2/2012 |

OTHER PUBLICATIONS

Search Report in related GB Application No. GB1420504.1, dated Oct. 27, 2015.

* cited by examiner

*Primary Examiner* — Stephen Gordon
(74) *Attorney, Agent, or Firm* — Troutman Sanders LLP; Ryan A. Schneider

(57) ABSTRACT

A frame system for supporting an associated vehicle for transport within an existing transportable structure having longitudinally extending side structures. The frame system has a transverse supporting frame supported by two vertical posts located one at each end of the supporting frame. Each post has an attachment for securing the top and bottom of the post at a plurality of locations along the length of the associated side structure and the supporting frame is raiseable with or without a vehicle loaded thereon and once raised is fixable to the posts at a chosen location for transport within the transportable structure. Each end of the support frame has an end plate for sliding up and down an inwardly facing surface on the adjacent vertical post as it is raised and lowered. At least one of the end plates has a telescopic connection with the remainder of the support frame.

15 Claims, 15 Drawing Sheets

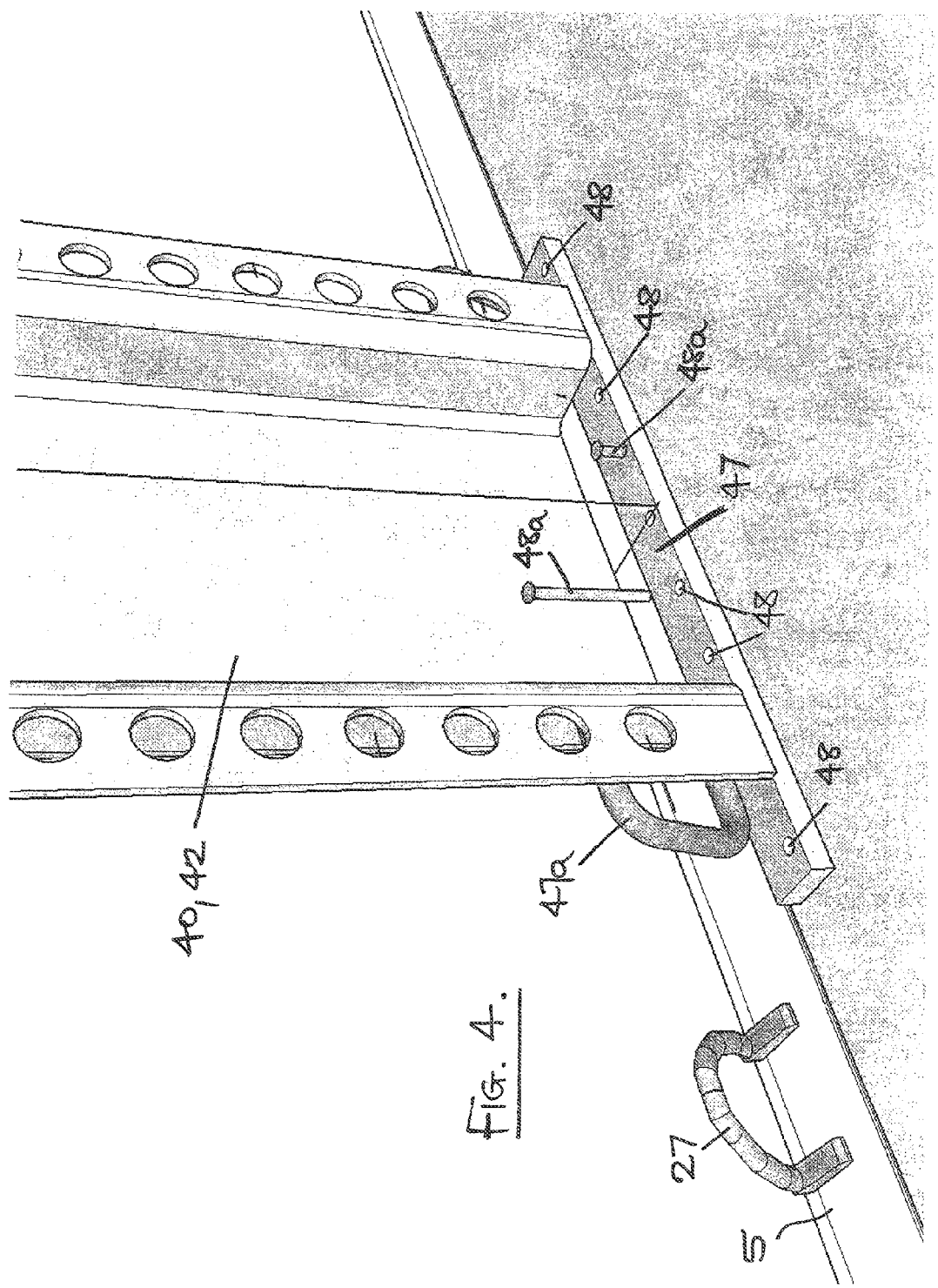

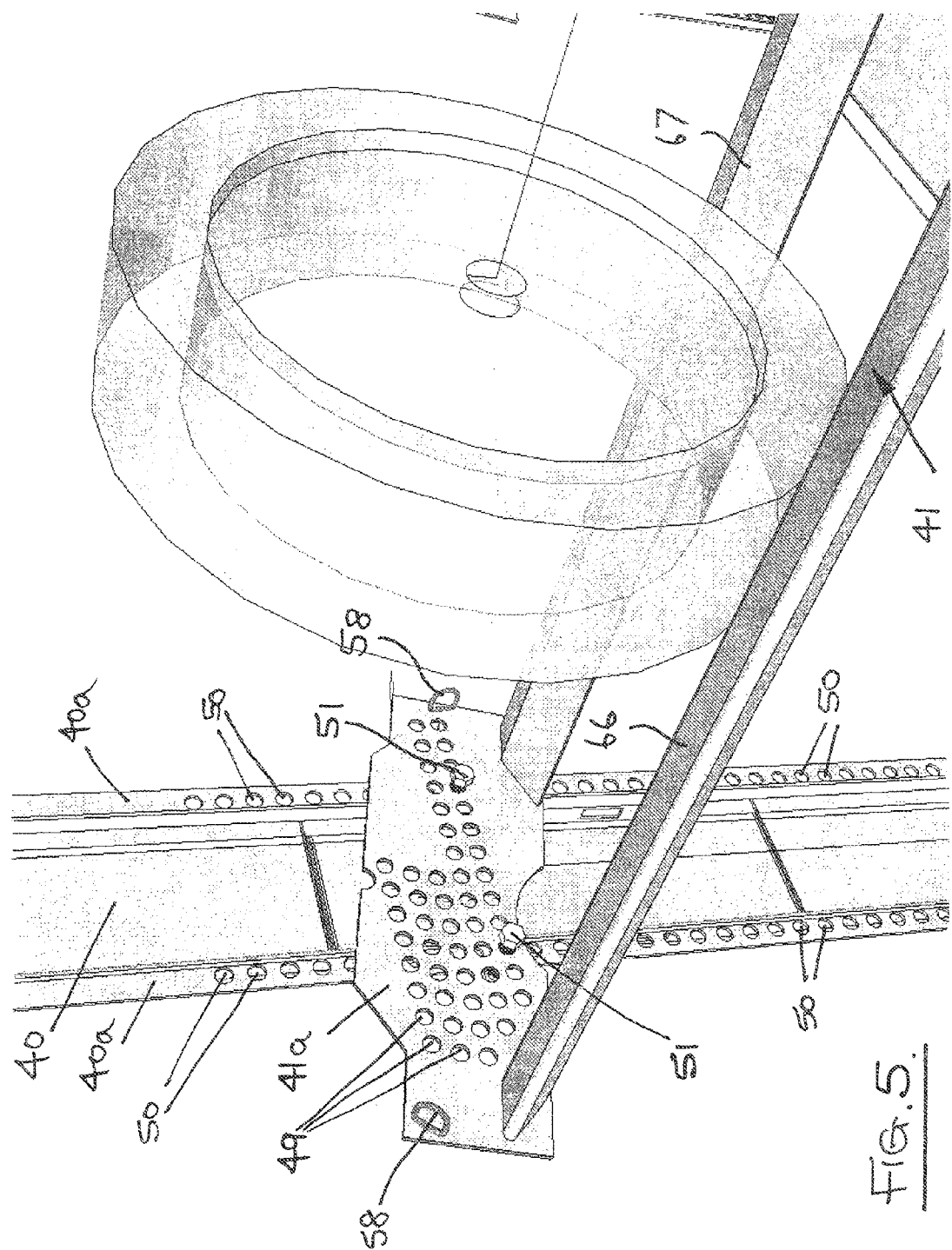

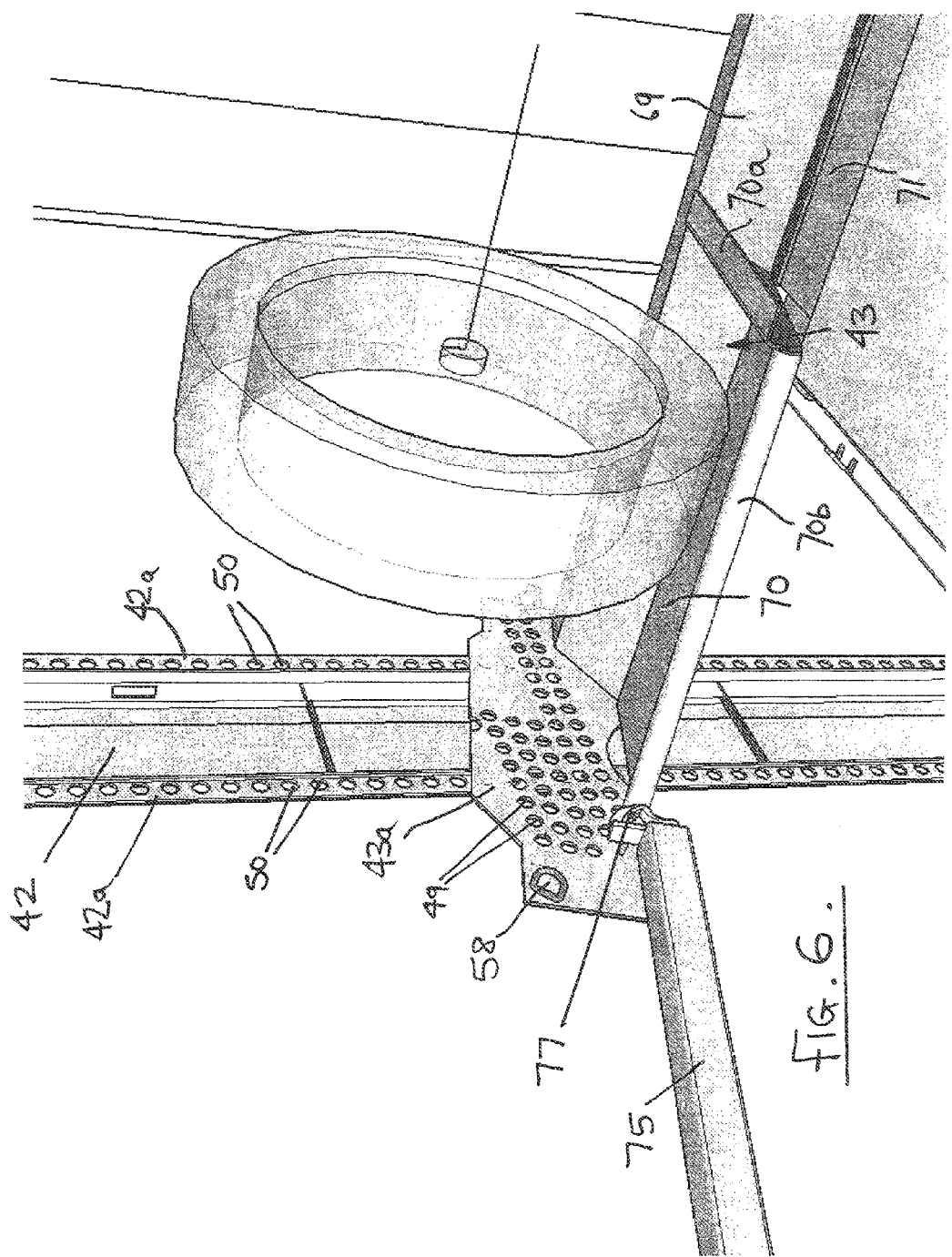

REMOVABLE FRAME SYSTEMS FOR VEHICLE SHIPPING

CROSS-REFERENCE TO RELATED APPLICATIONS

This application claims the benefit under 35 USC §119 (a)-(d) and (f) of UK patent application No. 1420504.1, filed 19 Nov. 2014, the entire contents and substance of that is hereby incorporated by reference.

BACKGROUND OF THE INVENTION

1. Field of Invention

This invention relates to frames systems for use in freight containers to allow vehicles to be raised above the floor of the container to allow other vehicles to be transported below.

2. Background and Related Art

It is known to provide such frame systems but with ever increasing freight costs there is a need to pack ever more vehicles efficiently into such containers.

An example of such a frame system is shown in the Applicants own PCT patent application No. PCT/GB2011/001229 (WO2012/022941) much of the content of which is included in the present application.

Whilst such frames are conventionally used in standard ISO containers the requirement to use such frame systems in containers on non-standard or different widths arises from time to time.

BRIEF SUMMARY OF THE INVENTION

It is an object of the present invention to provide a frame system which can be used in containers with different widths.

Thus according to the present invention there is provided a frame system for supporting an associated vehicle for transport within an existing transportable structure having longitudinally extending side structures, the frame system comprising a transverse supporting frame supported by two vertical posts located one at each end of the supporting frame, each post being provided with attachment means for securing the top and bottom of the post at a plurality of locations along the length of the associated side structure, the supporting frame being raiseable with or without a vehicle loaded thereon and once raised being fixable to the posts at a chosen location for transport within the transportable structure, each end of the support frame having an end plate for sliding up and down an inwardly facing surface on the adjacent vertical post as it is raised and lowered, the end plates having a telescopic connection with the remainder of the support frame so that the effective length of the support frame between the posts can be varied to allow the frame system to be used in existing transportable structures with different transverse spacing between the side structures.

Such a frame system is particularly suitable for use with the frame system disclosed and claimed in the previously referred to PCT patent application No. WO2012/022941 and the support frame can support for example, a wheeled vehicle or a vehicle body without wheels.

As described in the previously referred to PCT patent application the end plates may each including an array of bolt holes which can be aligned with bolt holes in the cooperating inwardly facing surface on the adjacent vertical post so that the frame can be fastened in a chosen position by inserting bolts through the aligned holes.

Thus, when the wheel support frame is pinned to its associated vertical post by a single bolt, the support frame can be rotated relative to the posts by raising or lowering the support frame so that the support frame is rotated about the single bolt to adjust clearance between the support frame and a vehicle below the support frame, another bolt being inserted through aligned bolt holes in each end plate and the associated post when the desired rotational position of the wheel support frame has been obtained.

Conveniently the transportable structure is a freight container such as a standard ISO container with standard fastening hoops attached to top and/or bottom side rails of the container.

The attachment means comprises ties of adjustable length which pull each post in the fore and aft direction relative to the side structure to locate each post.

The ties may also pull each post towards the adjacent side of the structure. Conveniently each tie is flexible and ratchet winch means are associated with each post for tensioning the flexible tension ties. Each flexible tie may pass through or around a guide member on the associated post which is spaced from the adjacent side of the structure to provide a pull force towards the adjacent side.

Using the above flexible tie arrangement which engages the standard fastening hoops secured to the upper and lower side rails of the container allows the position of the posts to be adjusted as required along the length of the container since the posts do not require any longitudinal engagement with the sides of the container other than through the hoops to locate the posts against longitudinal movement. In particular the posts do not engage the corrugations of the side walls of the standard ISO container for longitudinal location so that this frame system can be used in containers with no rigid sides or containers which are completely open or fitted with flexible side curtains. This ability to adjust the position of the posts along the container, in a manner which is independent of the shape of the sides of the container, gives maximum flexibility in accommodating vehicles of different sizes.

It is also possible to make small adjustments to the position of the posts even when a vehicle is loaded on the wheel support frames to vary the clearance between the vehicles in the container. This can be achieved by releasing and tensioning the ties on either side of the posts as required.

In a further variant the ties are rigid ties such as adjustable turnbuckles.

Each vertical post may be attached by ties at both the top and bottom. Alternatively, or additionally, the bottom of each vertical post may be provided with a fixing plate having holes through which screws or nails or similar fixings can be driven to attach the bottom of the post to a floor of the transportable structure.

The wheel supporting frame may be adjustable relative to each vertical post for rotation about a generally transverse axis when in its transporting position.

A hoist may be used to raise and lower the supporting frame relative to its associated vertical post.

The frame system employs four posts and two associated support frames for supporting the front and rear of the vehicle in its transport position.

The frame system may use identical posts and support frames. The support frames may comprise two transversely extending beams between which wheels of different diameter can be supported. In an alternative construction the wheel support frame may comprises a pair of transversely spaced wheel support plates cantilevered from a transverse beam, the plates being of a size sufficient to support the locus of the foot prints of vehicle wheels to be carried on the wheel support frame.

These and other objects, features and advantages of the present invention will become more apparent upon reading the following specification in conjunction with the accompanying drawing figures.

BRIEF DESCRIPTION OF THE DRAWINGS

Embodiments of the present invention will be now described by way of example only with reference to the accompanying drawings in which:

FIG. 4 shows a lower post fastening plate arrangement;

FIGS. 5 and 6 show details of the end plates used on front and rear support frames used in the frame system of FIGS. 1 to 4;

DETAILED DESCRIPTION OF THE PREFERRED EMBODIMENTS

Figure 1:
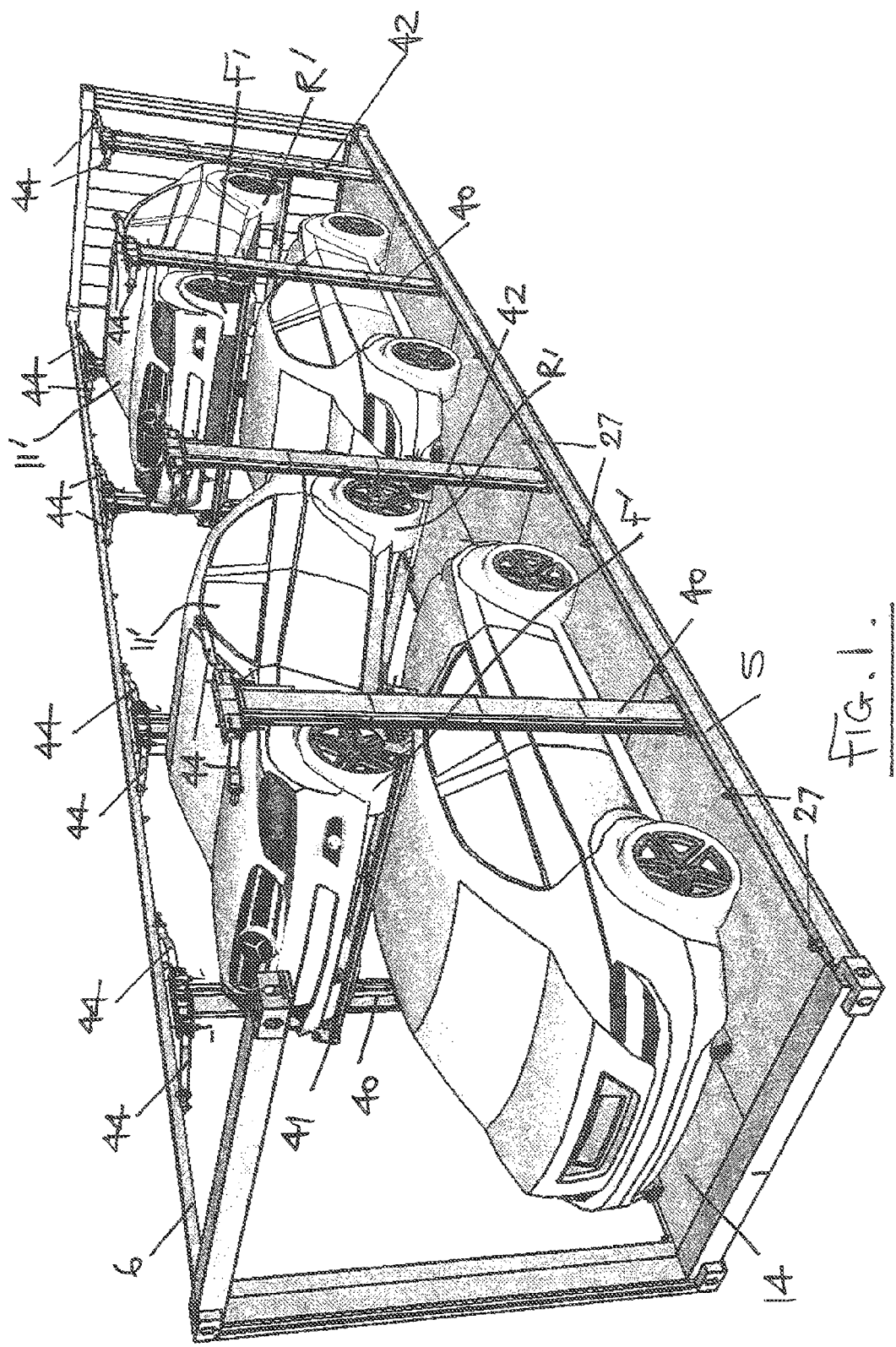
FIG. 1 shows a perspective view of a standard ISO container with one side and the roof removed in which a frame system in accordance with the previously referred to Applicant's PCT patent application No. WO2012/022941 is installed.

To facilitate an understanding of the principles and features of the various embodiments of the invention, various illustrative embodiments are explained below. Although exemplary embodiments of the invention are explained in detail, it is to be understood that other embodiments are contemplated. Accordingly, it is not intended that the invention is limited in its scope to the details of construction and arrangement of components set forth in the following description or illustrated in the drawings. The invention is capable of other embodiments and of being practiced or carried out in various ways. Also, in describing the exemplary embodiments, specific terminology will be resorted to for the sake of clarity.

It must also be noted that, as used in the specification and the appended claims, the singular forms "a," "an" and "the" include plural references unless the context clearly dictates otherwise. For example, reference to a component is intended also to include composition of a plurality of components. References to a composition containing "a" constituent is intended to include other constituents in addition to the one named.

Also, in describing the exemplary embodiments, terminology will be resorted to for the sake of clarity. It is intended that each term contemplates its broadest meaning as understood by those skilled in the art and includes all technical equivalents that operate in a similar manner to accomplish a similar purpose.

Ranges may be expressed herein as from "about" or "approximately" or "substantially" one particular value and/or to "about" or "approximately" or "substantially" another particular value. When such a range is expressed, other exemplary embodiments include from the one particular value and/or to the other particular value.

Similarly, as used herein, "substantially free" of something, or "substantially pure", and like characterizations, can include both being "at least substantially free" of something, or "at least substantially pure", and being "completely free" of something, or "completely pure".

By "comprising" or "containing" or "including" is meant that at least the named compound, element, particle, or method step is present in the composition or article or method, but does not exclude the presence of other compounds, materials, particles, method steps, even if the other such compounds, material, particles, method steps have the same function as what is named.

It is also to be understood that the mention of one or more method steps does not preclude the presence of additional method steps or intervening method steps between those steps expressly identified. Similarly, it is also to be understood that the mention of one or more components in a composition does not preclude the presence of additional components than those expressly identified.

The materials described as making up the various elements of the invention are intended to be illustrative and not restrictive. Many suitable materials that would perform the same or a similar function as the materials described herein are intended to be embraced within the scope of the invention. Such other materials not described herein can include, but are not limited to, for example, materials that are developed after the time of the development of the invention.

FIGS. 1 to 6 show a frame system for transporting complete wheeled vehicles. The same system can also be used for the transportation of vehicle bodies without wheels with the bodies being lifted into their transportation position on suitably adapted support frames by fork lift trucks or similar devices. Such a frame system is described and claimed in the Applicant's previously referred to PCT patent application No. WO2012/022941.

Figure 2:
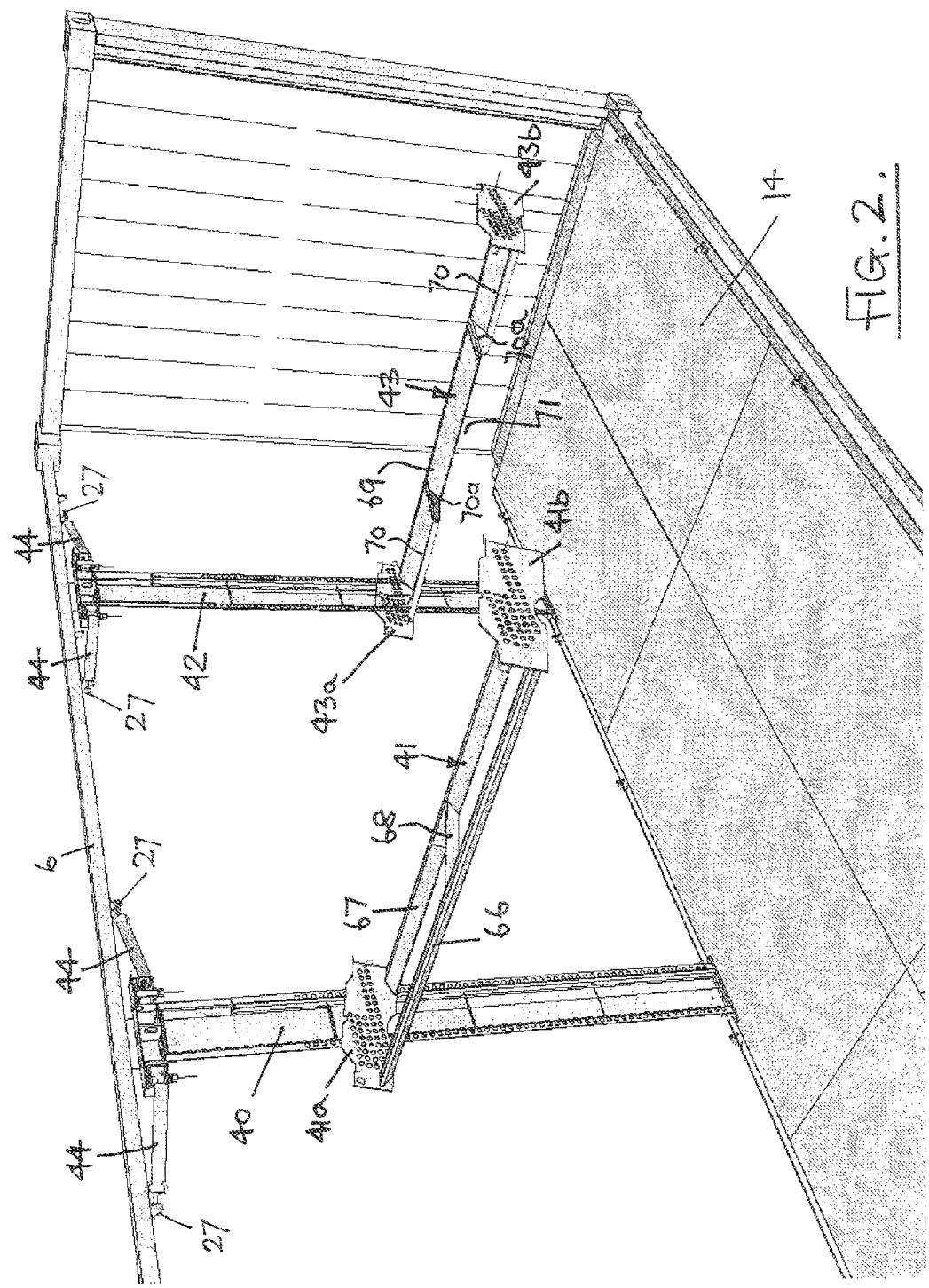
FIG. 2 shows part of the system of FIG. 1 on a larger scale.
Figure 3:
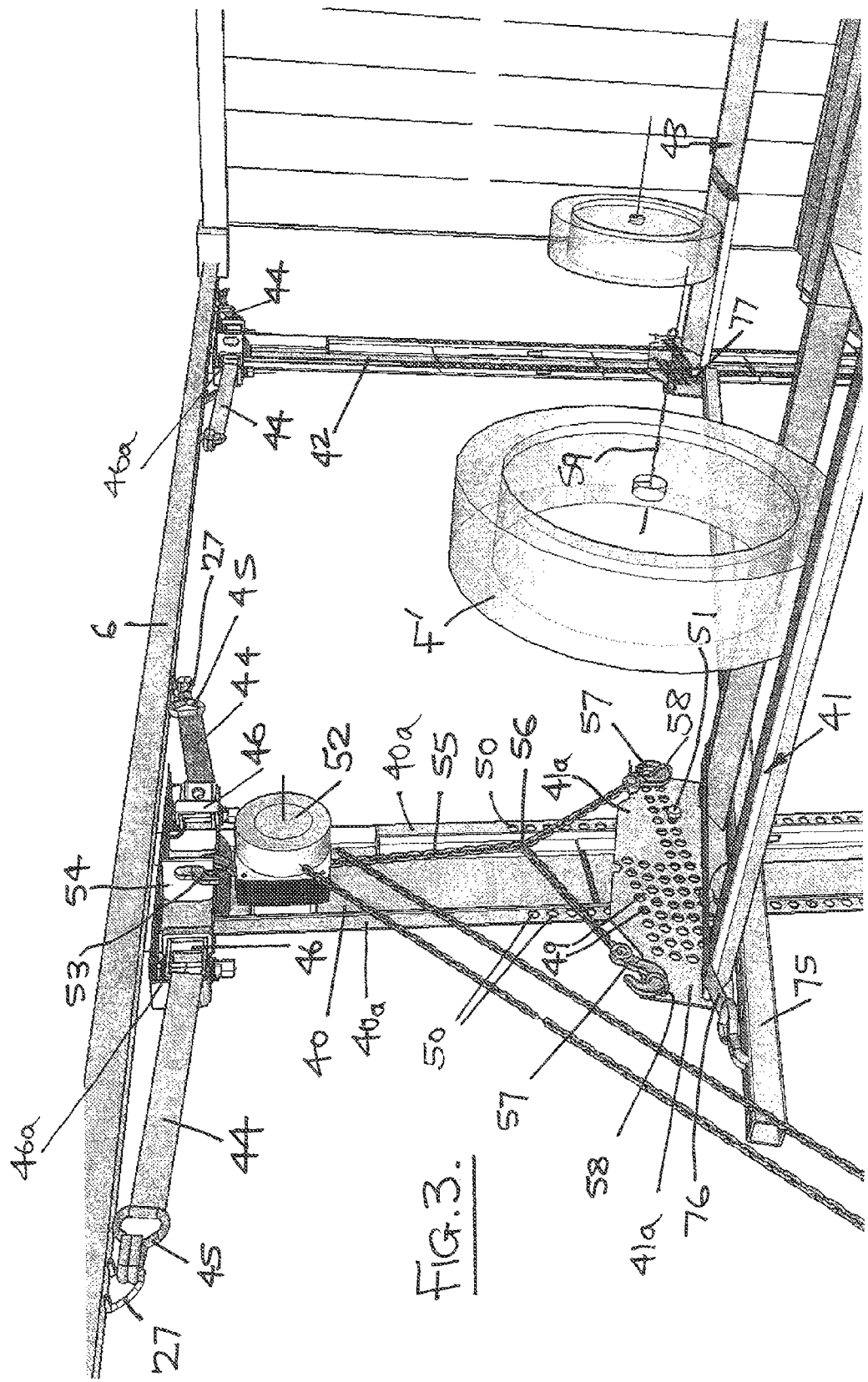
FIG. 3 shows a hoist arrangement used in the system of FIGS. 1 and 2.

The front set of wheels F' of upper cars 11' are each supported from a frame system which comprises a pair of vertically extending posts 40 between which a transversely extending front wheel support frame 41 extends. Similarly, the rear set of wheels R' of the upper cars 11' are each supported from a frame system which comprises a pair of vertically extending posts 42 between which a transversely extending rear wheel support frame 43 extends. The front and rear wheel support posts 40 and 42 are identical. Each post is secured to the container using flexible ties 44 (e.g. of webbing) which have hooks 45 for engagement with securing hoops 27 secured to the underside of the top side rails 6 of the container. The other ends of ties 44 are engaged by ratchet winches 46 so that the posts can be braced relative to the container in the fore and aft directions by tensioning ties 44 as shown in FIGS. 1 to 3. The ties 44 when tensioned pass over guide shoulders 46a and tend to pull the posts outwardly towards the sides of the container thus further stabilizing the posts.

The bottom end of each post 40, 42 is provided with a fixing plate 47 (see FIG. 4) having holes 48 through which nails or screws 48a can be driven into the standard plywood floor lining 14 of the container to further locate the post. Alternatively or additionally flexible ties or lashings or rigid turnbuckles (not shown) can be used between lashing hoops 47a carried by plates 47 and the fastening hoops 27 mounted on bottom rails 5 to locate the bottom ends of the posts.

Each wheel support frame 41 and 43 has end plates 41a, 41b and 43a and 43b respectively. These end plates have arrays of holes 49 which can be used to secure the end plates to the posts using bolts 51 (and associated nuts not shown) extending through holes 50 in outwardly turned flanges 40a and 42a on posts 40 and 42 (see FIG. 5) when the cars are in their transport positions. These end plates slide easily and with a small clearance vertically, longitudinally and rotationally over flanges 40a and 42a so that the final transport positions of the wheel support frames 41 and 43 relative to the posts 40 and 42 can easily be adjusted when the cars have been raised to the transport height.

The wheels are secured to the wheel support frames by webbing straps and ratchets (not shown but similar to lashings 20a shown above) which lash the wheels to the wheel support frames. The longitudinal accelerations acting on the cars thus pass through the axles of the cars which in turn try to rotate the wheel frames, now held by the bolts 51.

The wheel support frames 41 and 43 can be raised and lowered relative to the posts 40 and 42 by chain hoists 52 which have hooks 53 which engage eye plates 54. Hoists 52 are partly recessed within posts 40 and 42 to keep the lifting chains 55 close to the neutral axes of the posts to minimize bending of the posts. The lifting chains 55 divide at 56 to provide a two point lift using hooks 57 which engage rings 58 screwed to the end plates. This provides a stable lifting arrangement as the chain divide at 56 is above the rotation axis 59 of the wheel F' on the associated wheel support frame.

The posts 40, 42 are located so that their vertical centre lines are aligned within about 100 mm short of the axis of the car wheel axles. Thus the chains 55 hang down close to the vertical when the car is on the floor and as it is lifted and tilted to its transport angle of say 20 degrees, the chain 55 remains close to the vertical.

So, as will be appreciated, since the wheel support frames 41 and 43 hang from the closely vertical chains 55 they can be swung longitudinally typically +/−150 mm relative to their associated post 40, 42 on their flanges 40a, 42a so that a car supported from the associated wheel frames can be displaced longitudinally by the swinging movement of the chains 55 prior to the insertion of bolts 51. Typically an 1800 kg car can be displaced longitudinally by a horizontal force of 100 kg. The end plates can also be rotated relative to their associated posts to optimize clearance between the cars and the frame system components. This rotation can be easily achieved by inserting one bolt 51 in each end plate through aligned holes 49 and 50 and then raising or lowering the wheel frame so that it rotates about the inserted bolt 51 until another appropriate pair of holes 49 and 50 are aligned for the insertion of a second bolt 51. The same procedure is carried out simultaneously on both ends of each wheel support frame. Thus the wheel support frame is now secured very firmly to the posts for motion in all directions ready for transport and handling.

When a car is raised and tilted for transport typically 20 degrees, the horizontal distance between the wheels reduces. The horizontal distance of a car with a wheel base of 3 m will reduce by about 180 mm at 20 degrees. Thus with the posts now firmly located in place to enable safe lifting of the car, the fixing of the wheel frames to the posts allows for relative displacement of frame to post at each end of the wheel frame as well as from front wheel frame to rear wheel frame. Furthermore, if the wheel frames are to be allowed to rotate about a transverse axis, further adjustment still is required.

It will be appreciated that this ability of the wheel support frames to be adjusted both longitudinally and rotationally relative to the posts is an independent inventive concept which is useable in frame systems which do not necessarily use the ties 44 to secure the posts to the container.

As can be seen best from FIG. 5 the front wheel support frame 41 comprises two tapered cross beams 66 and 67 which extend between the end plates 41a and 41b and an intermediate longitudinal brace 68.

The rear wheel support frame 43 comprises a single transverse beam 69 and wheel support plates 70 supported from beam 69 via cantilever beams 70a extending from beam 69 and shallow edge beams 70b to maximize the space available to any car below. These wheel support plates 70 can accommodate a wide range of wheel diameters (e.g. typically 450 mm to 750 mm diameter). A gap 71 is provided between cantilevered beams 70a to increase clearance with adjacent car bodies during transportation.

It should be appreciated that the 'front support frame 41' and 'rear support frame 43' relate to the ideal support of typical front and rear wheels of a car. However in practice the operator of the cars can choose to stow the support frames or car in a reversed position so as to put the front wheels nearest the closed end of the container with the support frame positions unchanged. Alternatively he may choose to put the 'front support frame' nearest to the closed end of the container and the 'rear support frame' nearest the door end of the container. Or furthermore, two 'front (or rear) support frames' might be used to support a single car such is the adaptability of the invention to the varying needs of car stowage presented by the wide variations in geometry of cars.

As will also be appreciated, the use of flexible ties 44 which engage the standard fastening hoops 27 secured to the upper and lower side rails 6 and 5 allows the position of the posts 40 and 42 to be adjusted as required along the length of the container since the posts do not require any engagement with the sides of the container other than through the hoops 27 to locate the posts against longitudinal movement. In particular the posts do not engage the corrugations of the side walls of the container for longitudinal location so that this frame system can be used in containers with no rigid sides or containers which are completely open or fitted with flexible side curtains. This ability to adjust the position of the posts along the container, in a manner which is independent of the shape of the sides of the container, gives maximum flexibility in accommodating cars of different sizes.

It is also possible to make small adjustments to the position of the posts even when a car is loaded on the wheel support frames to vary the clearance between the cars in the container. This can be achieved by releasing and tensioning the ties 44 on either side of the posts as required.

As indicated above, each of the posts 40 and 42 can be tied to the side rails 5 and 6 via hoops 27 by four ties 44, two ties at the top and two ties at the bottom or alternatively the two bottom ties can be replaced or augmented by the fixing plate 47. As four posts are used to support each car, if the car weighs 2000 kg, for example, under a rail shunt of say 4 g, this would exert a theoretical force of 8000 kg on the four posts. However, as each post has at least one tie acting in each direction at the top and one tie or fixing plate acting in each direction at the bottom, this gives a total of eight fixing points to the container to share the 8000 kg force. Thus the force of 1000 kg on the ties and container fastening hoops 27 or floor plate is well within their strength rating even when a massive 4 g acceleration is experienced. If extra restraint is needed for heavy car loads, then more ties and ratchet devices can be added connected with other fastening hoops 27.

A frame system in accordance with the second form of the present invention to support all four wheels of a vehicle above the floor of a container comprises four posts, front and rear wheel support frames, four hoists (which can be disconnected once the vehicle is secured in its transport position for use with other frame systems), and the necessary ties and bolts etc to secure the posts to the fastening hoops of the container.

It is envisaged that, although posts 40, 42 can be located longitudinally independently of the shape of the sides of the container, the posts might align with and even fit within a valley of a corrugated sidewall of the container. Any difference in the transverse span of the wheel support frames due to the posts entering the sidewall valleys can be accommodated by the provision of wheel support frames of adjustable transverse width. Also, if the posts were to be located in the sidewalls valleys any discrepancy in the longitudinal spacing of the wheel support frames and the wheel positions of the vehicle to be supported can be accommodated by adjusting the longitudinal position of the wheel support frames relative to the posts.

It is an important feature of the present invention that the components of the frame system are individually of low weight and so can be manhandled into position. However a fully assembled and thus heavier assembly can be handled with a fork truck or crane.

It will be appreciated that, if desired, the front and rear wheel support frames 41 and 43 can easily be interchanged on the common posts 40 and 42 so that the cars are carried facing backwards or forwards in the container.

FIG. 3 shows a beam 75 lashed under the front wheel support frame 41 by lashing 76. At the other end beam 75 is hooked at 77 (see FIG. 6) to the rear wheel support frame 43. The purpose of this beam 75 is that, should a car with rear wheel drive and hand brake be loaded, a safe means is needed to prevent the freely rotating front wheels from rotating during the lashing and lifting operation. Hand brakes and gearing associated with the front wheels normally make this beam 75 unnecessary but 20% of cars have freely rotating front wheels. The beam 75 thus ensures that the wheel support frames remain rotationally aligned with the body of the car as the car is raised.

Figure 7A:
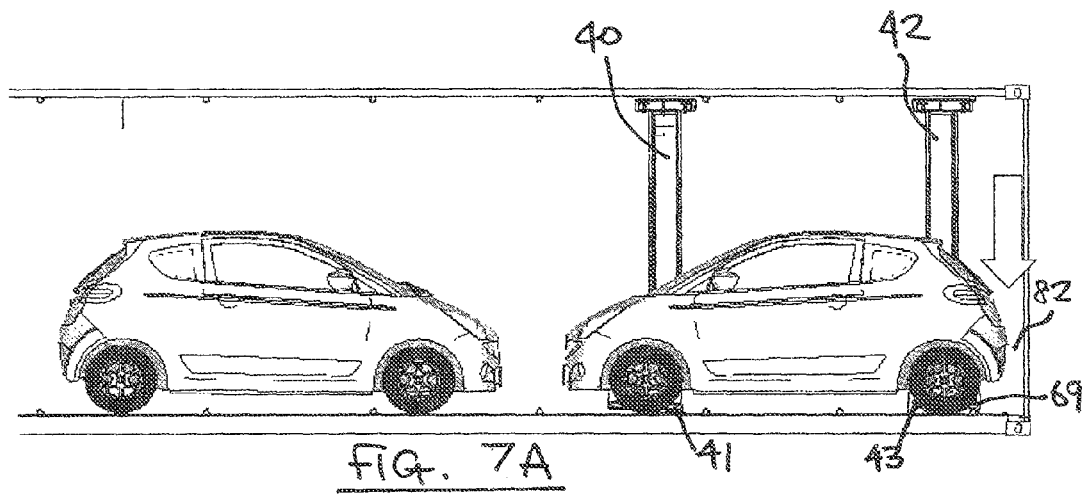
FIGS. 7A to 7C show various stages in the loading and adjustment of the position of a vehicle using the second form of frame system in accordance with the present invention.

FIG. 7A shows the typical loading of vehicles and some of the space problems encountered. In FIG. 7A the post locations are set as best envisaged. The wheel support frames 41, 43 are set on the floor and using the bolts 51 are pinned against slipping whilst the car is driven onto the wheel frames. The car is driven backwards and comes to a stop against the deep transverse beam 69 of the rear wheel support frame 43. Note the space 82 between the back of the car and the container end wall.

Figure 7B:
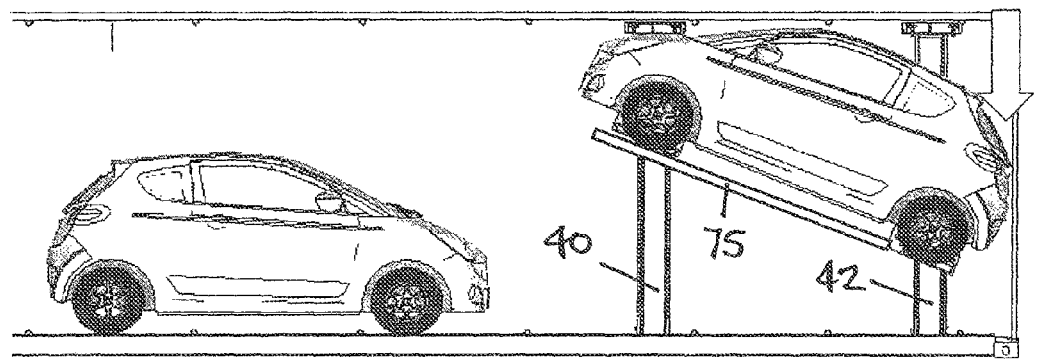
Figure 7C:
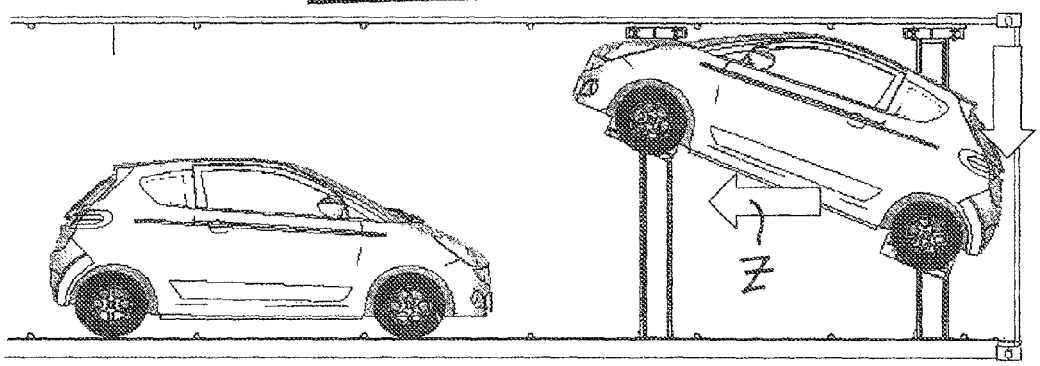

In FIG. 7B as the car is raised and tilted, typically the rotation causes the back of the car to rotate towards the end wall, and often too close for safe transport. Thus it is necessary to move the car away from the wall by displacing the wheel support frame longitudinally relative to the posts (as shown by arrow Z in FIG. 7C) before securing the frames to the posts 40, 42 with bolts 51 for transport. As indicated previously, this longitudinal movement of the car is relatively easy as the car is suspended from vertically extending hoist chains 55. If required the beam 75 can be used to control free rotation of the wheel frames. Once the bolts have secured the wheel frames to the posts 40, 42, the beam 75, if fitted, can be removed and so can the four hoists for use in raising the next car. This removal of the hoists provides an additional anti-theft device as the car cannot be lowered without the hoists.

A further method of displacing the vehicle away longitudinally from a wall or other vehicle is to slacken and tighten the webbing winches at the top of a pair of posts to displace the top of the post to or from the obstruction displacing the vehicle at the same time.

Figure 8A:
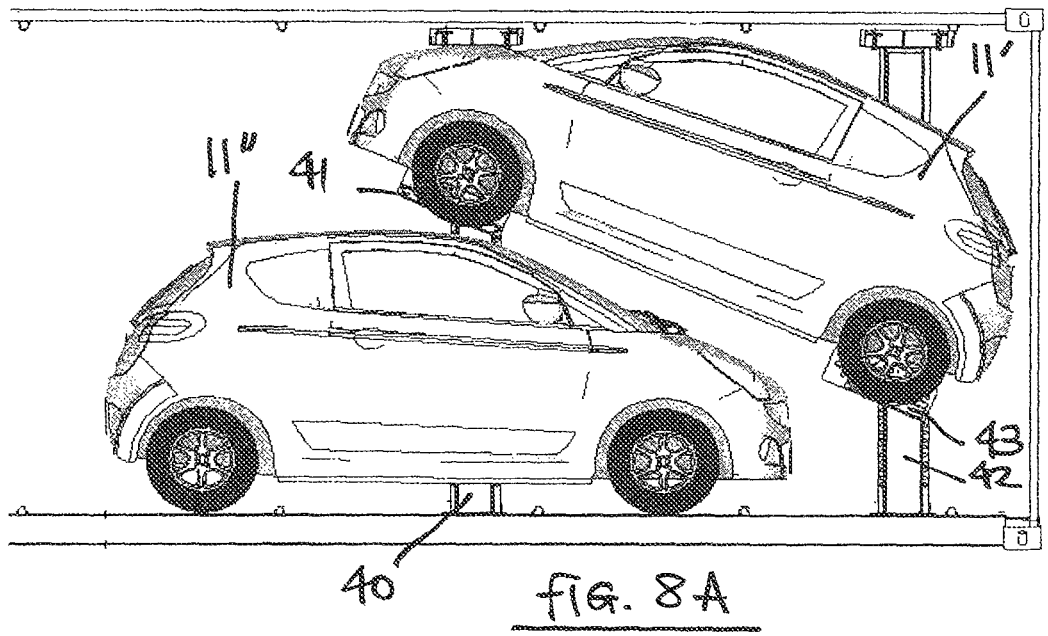
FIGS. 8A and 8B show further positioning movement of vehicles during loading.
Figure 8B:
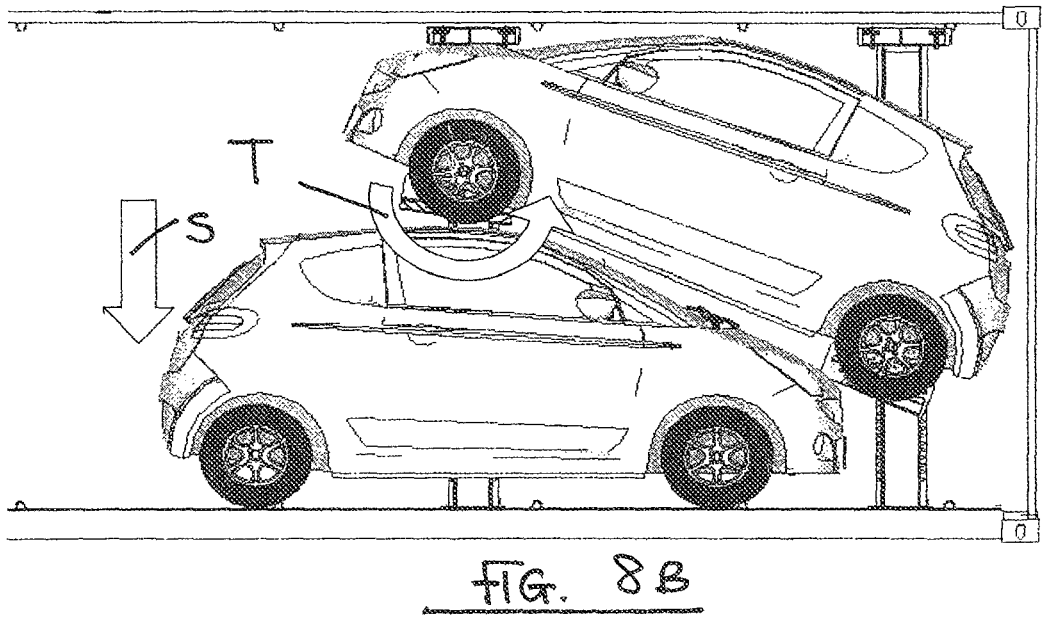

In FIG. 8A, it can be seen that should the front wheel support frame of the top car 11' be too close to the roof of the bottom car 11", thus preventing the bottom car penetrating fully into the container, the wheel support frame 41 can be rotated (see arrow T in FIG. 8B) in this example anti-clockwise by judicious manipulation of the hoist and a single bolt 51 to form a pivot so that extra headroom is formed under the front wheel support frame 41. In this example the bottom car 11' is able to enter the container a full 300 mm more (see arrow S) than might otherwise be possible with competitive designs having fixed orientation of their wheel support frames to the car body line.

In accordance with the present invention the above described frame system can be significantly improved, as shown in FIGS. 9 to 13, by mounting the end plates, the equivalent of end plates 41a, 41b and 43a, 43b, on the support frames 41 and 43 in a transversely adjustable manner so that the effective length of the support frames between the posts 40, 42 can be varied to allow the frame system to be used in existing transportable structures with different transverse spacing between the side structures.

The commonly encountered ranges of distances between the side structures of typical containers are shown diagrammatically in FIGS. 12A to 12C. FIG. 12D also shows how the adjustable support frame also allows adjustment for changes in the width of containers due to damage to the container during use.

Figure 9:
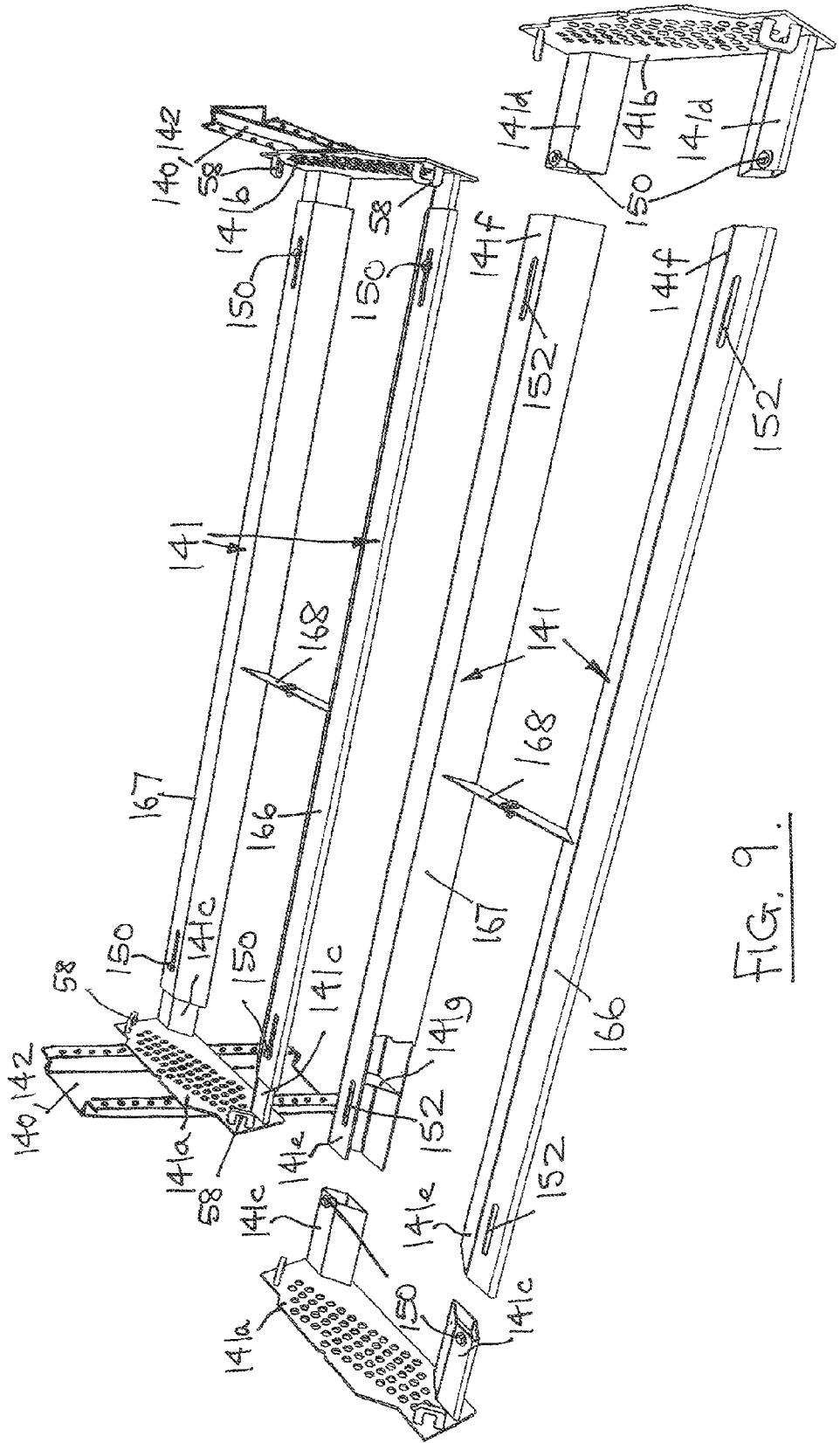
FIG. 9 shows a perspective view, partly cut away, of a telescopic wheel support frame in accordance with the present invention in assembled and exploded conditions.
Figure 10:
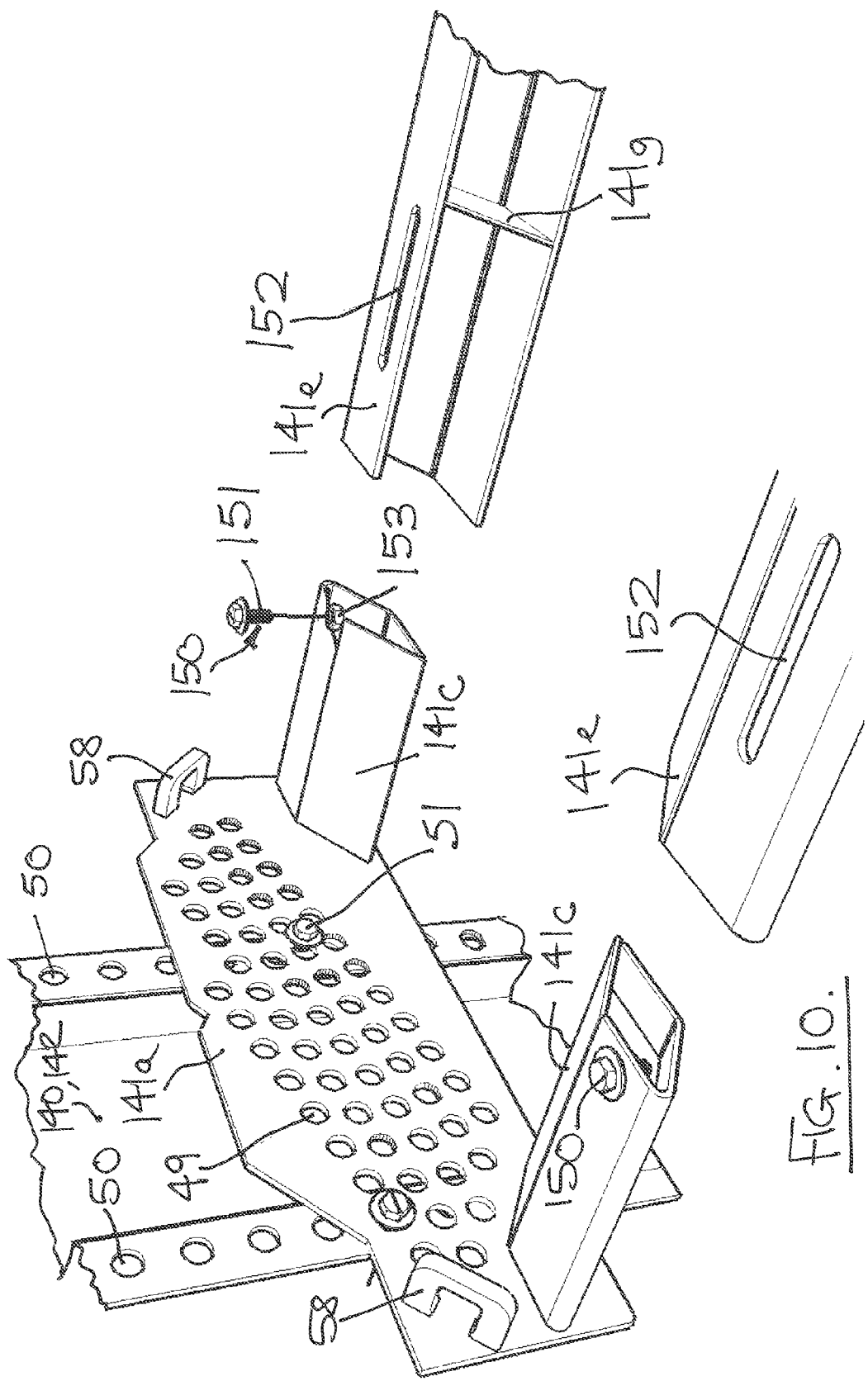
FIG. 10 shows one end of the wheel support frame shown in FIG. 9 on a larger scale.
Figure 12:
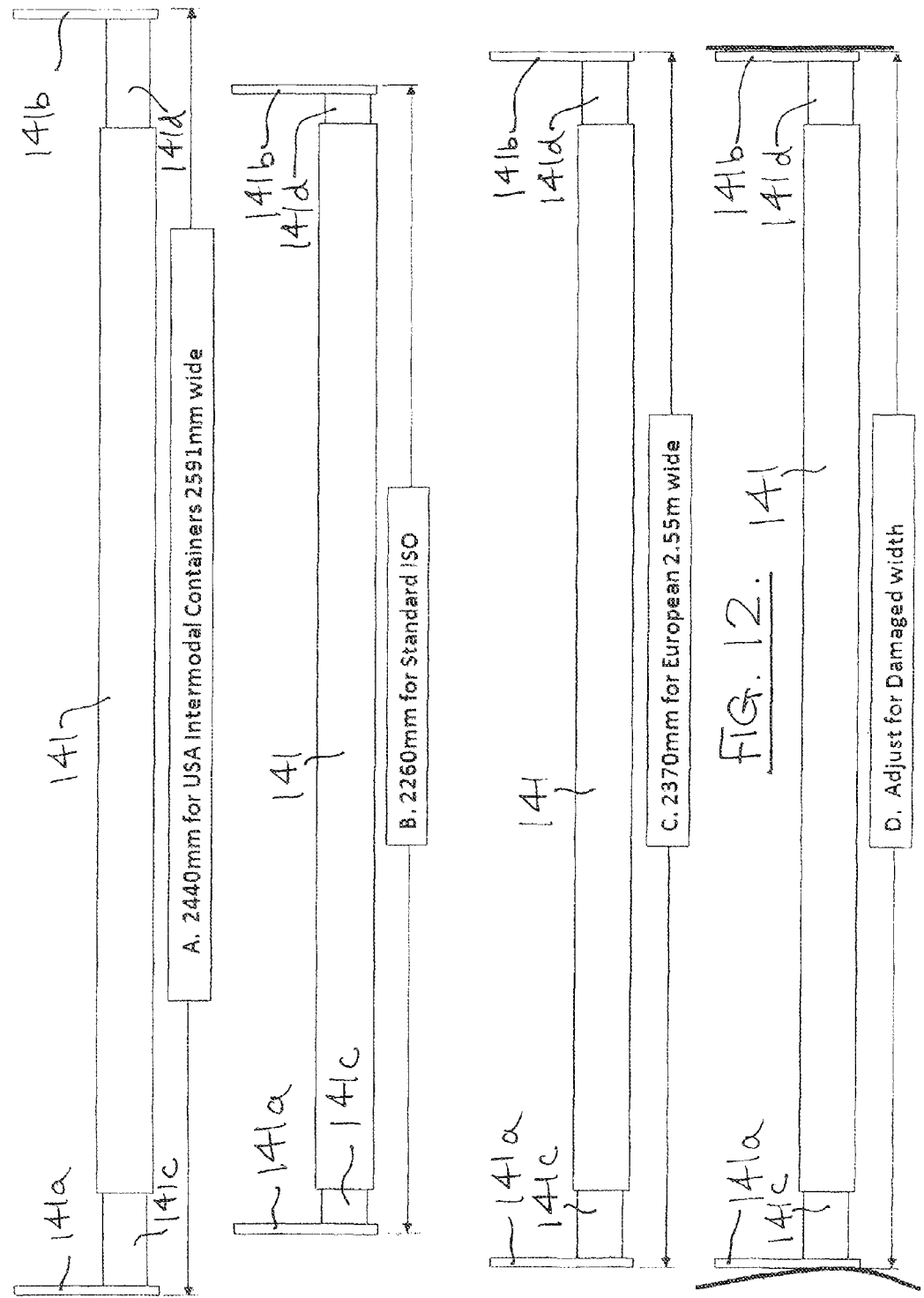
FIG. 12 at locations A to C shows diagrammatically the range of container widths commonly encountered and also at location 12D a damaged container wall which an adjustable support frame in accordance with the present can accommodate.

Referring to FIGS. 9 and 10, only one pair of posts 140 and front wheel support frame 141 are shown but identical posts and support frame can be used for the support of the rear wheels of the vehicle. As can be seen from FIGS. 9 and 10, end plates 141a and 141b are provided with spigots 141c and 141d which extend telescopically into the end portions 141e and 141f of the remainder of the support frame provided by cross beams 166 and 167 and brace 168 to allow adjustment of the effective length of the support frame so that the support frame can fit a wide range of container widths as shown in FIG. 12. The end portions 141e and 141f of the remainder of the support frame have internal cross webs 141g adjacent their ends which limit the movement of the spigots into the remainder of the support member to resist shock end loads applied via the end plates 141a and 141b during use of the frame system in, for example, rough sea conditions. Abutment of the ends of the spigots with the webs 141g prevents the end plates contacting the vehicle being transported.

In order to reduce the bending moment applied to spigots 141c and 141d these spigots are as short as possible. By having spigots at both ends of the support frame the range of adjustment can be increased without excessive spigot length. If desired spigots may only be used at one end of the support frame.

Figure 11:
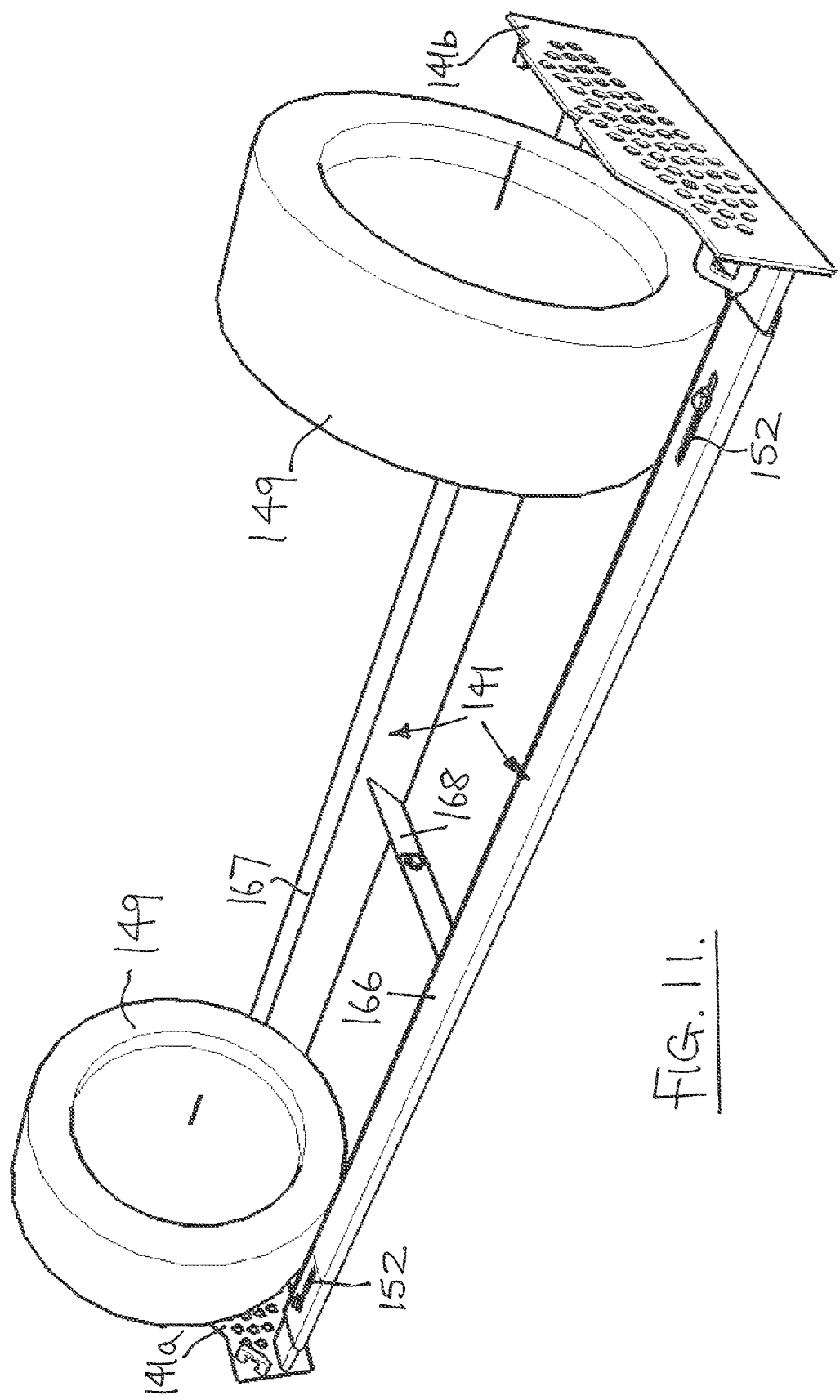
FIG. 11 shows the frame of FIGS. 9 and 10 with vehicle wheels in their transport position.

By having the spigots 141c and 141d extending inside the end portions 141e and 141f of the remainder of the support frame 141 the wheels 149 of the vehicle can rest on the ends of the support frame 141 allowing the spigots to easily slide in and out of the end portions of the support frame as required when adjusting the length of frame with a vehicle in position on and even lashed to the support frame (see FIG. 11). Also the provision of the smooth outer surface of the end portions 141e and 141f of the remainder of the support frame is important in avoiding tire scuffing and cutting.

The end plates 141a and 141b are held in a fixed position relative to the remainder of the support frame 141 by fastening means in the form of one or more nut and bolt fasteners 150 which comprise bolts 151 which extend through slots 152 in the end portions 141e and 141f of the remainder of the support frame 141 to engage nuts 153 which are tack welded to the inside of the spigots 141c and 141d. When bolts 151 are tightened the telescopically overlapping portions of the spigots and the end portions of the support frame are clamped together in the desired position. As can be seen from FIG. 11 the bolts 151 extend through surfaces of the support frame which do not contact the tires when the vehicle is in its transport position. This again helps prevent tire damage.

As can be seen from FIGS. 9 and 10 the end plates 141a and 141b are again provided with bolt holes 49 through which bolts 51 can extend to engage holes 50 in the vertical posts to fasten the support frame in the desired transportation position as previously described above.

Figure 13:
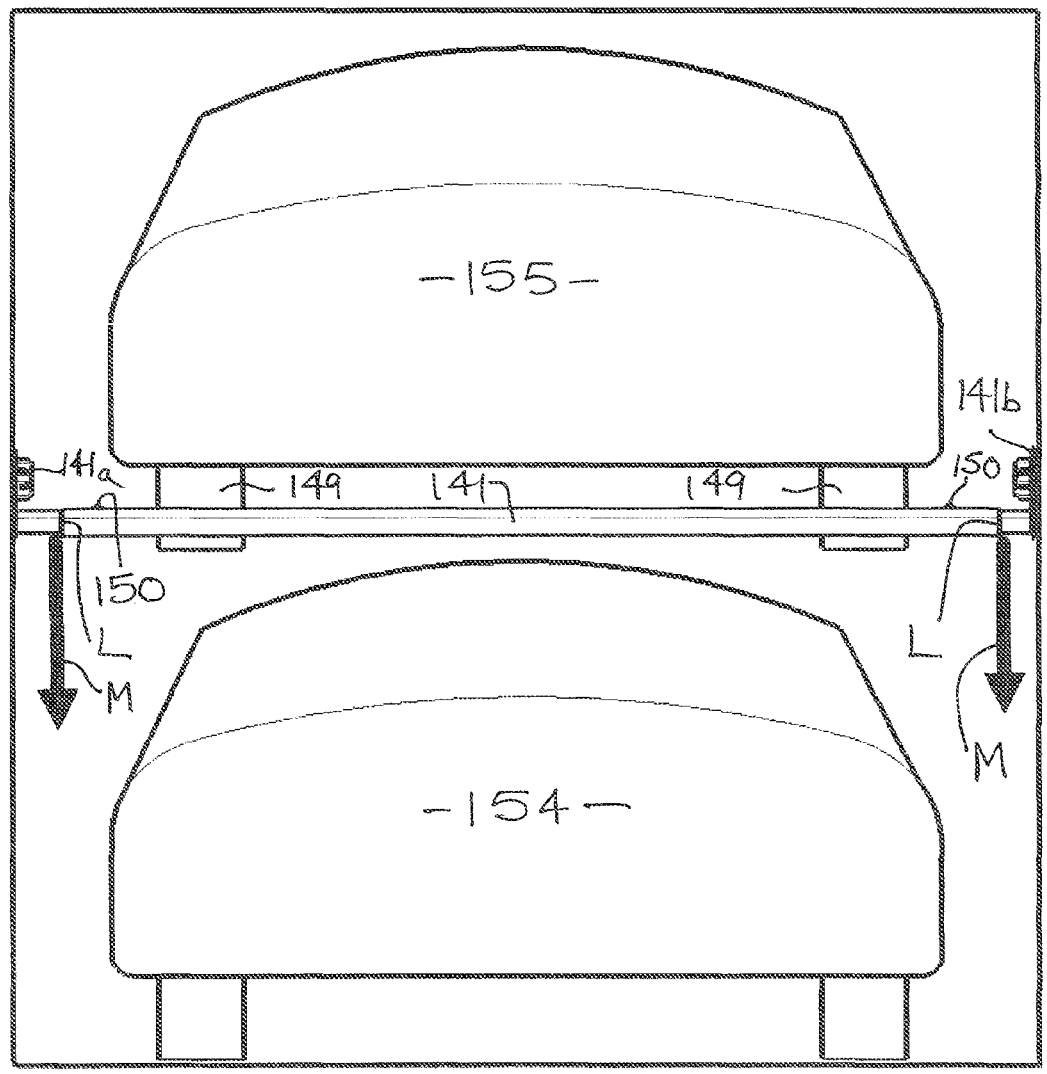
FIG. 13 shows diagrammatically how dripping onto a vehicle carried on a lower level is avoided.

A further feature of the invention shown in FIG. 13 is that the end portions 141e and 141f of the remainder of the support frame 141 which overlap the spigots 141c and 141d on the end plates extend to locations L adjacent the end plates 141a and 141b so that any condensation leaking from within the remainder of the support frame 141 (see arrows M) does not drip down onto any vehicle 154 being carried in the transportable structure at a position below the vehicle supported on the support frame 141.

Figure 14:
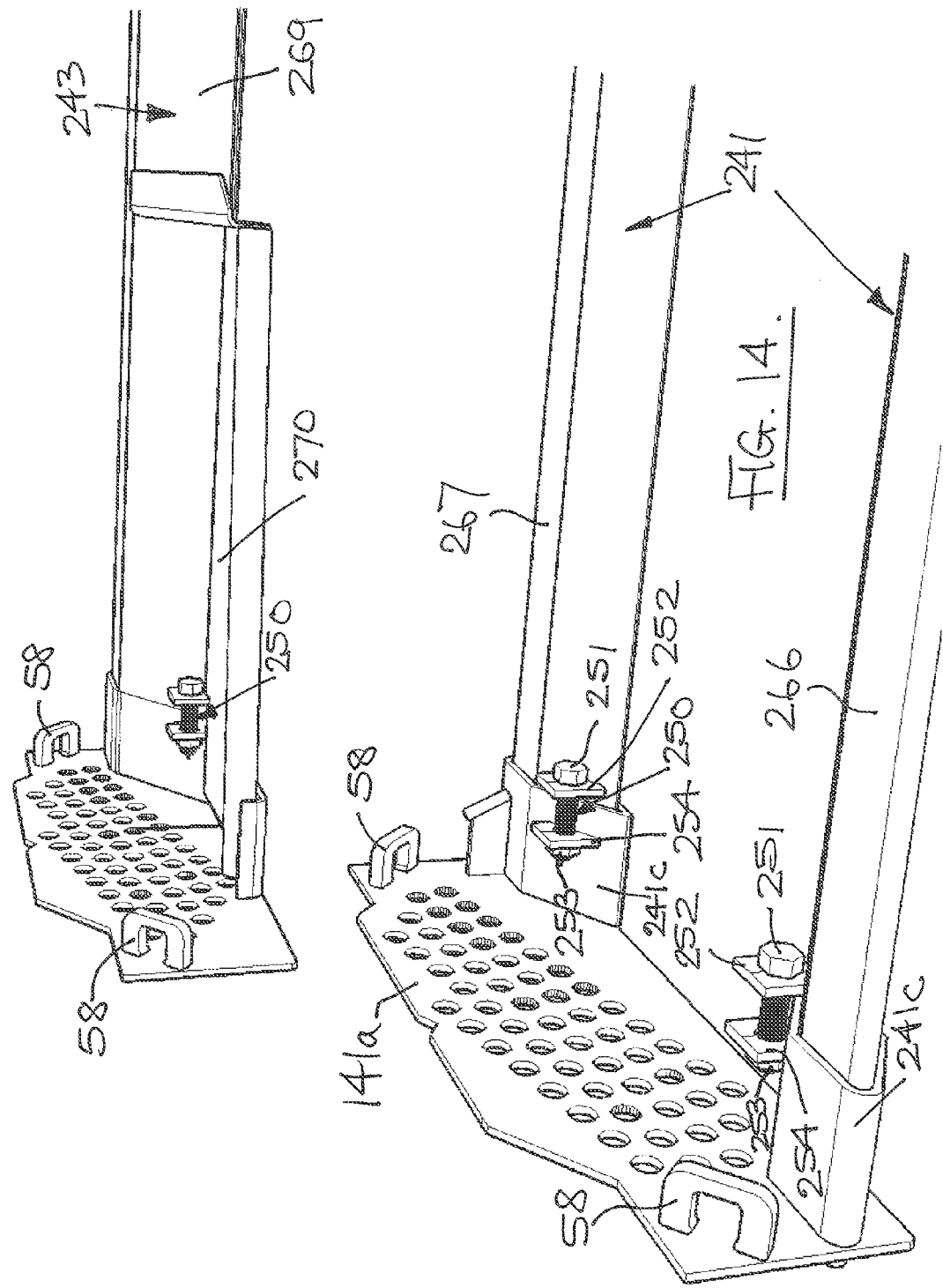
FIG. 14 shows an alternative construction in which the end plates are provided with projecting sleeves rather than spigots.

As shown in the lower part of FIG. 14, in an alternative arrangement to that described above, the end plates 241a and 241b are provided with projecting sleeves 241c and d which telescopically encircle the end portions 241e and 241f of the remainder of the support frame 241 provided by cross beams 266 and 267 to again allow adjustment of the effective length of the support frame. In this arrangement the fastening means for securing the end plates in a fixed position relative to the remainder of the support frame comprises nut and bolt fasteners 250. These nut and bolt fasteners comprise bolts 251 which extend through screw threaded holes in flanges 252 welded to the remainder support frame 241 and engage nuts 253 welded to flanges 254 which are in turn welded to sleeves 241c and 214d. When bolts 251 are tightened the telescopically overlapping portions of the sleeves 241a and 241b and the end portions of the support frame are clamped together in the desired position.

The upper part of FIG. 14 shows the sleeve 241c used with the nut and bolt fastener 250 on a rear wheel support frame 243 having a single cross beam 269 with a pair of transversely spaced wheel support plates 270 cantilevered from the cross beam similar to that shown at 69, 70 in FIGS. 2, 3 and 6, FIG. 15 shows yet a further form of the invention in which the telescoping facility is provided in a mid portion of a rear wheel support frame 341 to allow the spacing between the end plates 141a and 141b to be adjusted. In this arrangement a sleeve 342 is welded to one part 341A of the support frame 341 and the other part 341B of the support frame slides inside this sleeve. A nut and bolt fastener 350 comprises a bolt 351 which extend through a slot 352 in the sleeve 342 and engages a nut (not shown) welded to the inside of the part 341B. When bolt 351 is tightened the telescopically overlapping portions of sleeve 342 and part 341B are clamped together in the desired position.

Although the mid portion telescopic facility is shown above in relation to a support frame 341 provided by a single cross beam 369 with a pair of transversely spaced wheel support plates 370 cantilevered from the cross beam similar to that shown at 69, 70 in FIGS. 2, 3 and 6, this mid portion telescopic facility can be employed on support frames having two cross beams as shown in FIGS. 9, 10, 11 and the lower part of FIG. 14.

Figure 15:
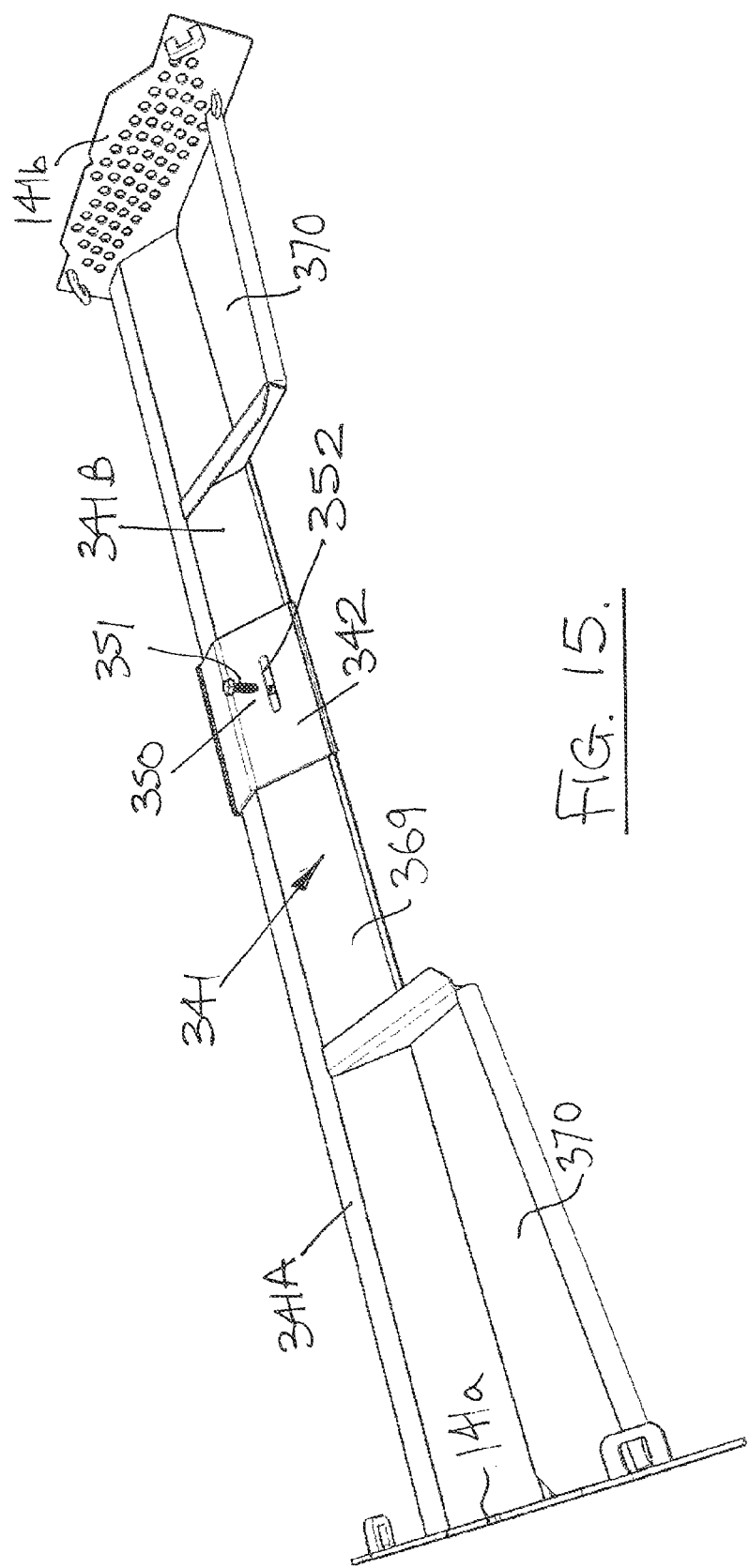
FIG. 15 shows an alternative construction in which the telescopic feature is provided in a mid portion of the support frame.

The various telescopic adjustment arrangements described above in relation the front wheel support frames with two cross beams 166 and 167 and shown in FIGS. 9, 10, 11 and 14 can also be used in the single cross beam rear wheel support frames of the form shown in FIG. 15. Also, as indicated above, identical front wheel type support frames can be used for both front and rear wheel support.

As will be apparent to those skilled in the art any other suitable fastening means may be used to secure the end plates in their required position relative to the remainder of the support frame.

To reduce weight the frame system is manufactured from high elasticity steel which provides the necessary robust construction at a lower weight.

Numerous characteristics and advantages have been set forth in the foregoing description, together with details of structure and function. While the invention has been disclosed in several forms, it will be apparent to those skilled in the art that many modifications, additions, and deletions, especially in matters of shape, size, and arrangement of parts, can be made therein without departing from the spirit and scope of the invention and its equivalents as set forth in the following claims. Therefore, other modifications or embodiments as may be suggested by the teachings herein are particularly reserved as they fall within the breadth and scope of the claims here appended.

What is claimed is:

1. A frame system for supporting an associated vehicle for transport within a closed shipping container having longitudinally extending sides, front, back, roof and floor, the frame system comprising a transverse support frame having two beams extending transversely across the shipping container from one of the longitudinally extending sides of the shipping container to another one of the longitudinally extending sides of the shipping container between which wheels of the vehicle to be transported can be supported, the beams being supported by two associated vertical posts located one at each end of the transverse support frame, each vertical post being provided with attachment means for securing the top and bottom of the vertical post to the shipping container at a plurality of locations along the length of the longitudinally extending sides of the shipping container, the transverse support frame when in the shipping container being raiseable relative to the associated vertical posts with or without a vehicle loaded thereon and once raised being fixable to the posts at a chosen location for transport within the shipping container, each end of the transverse support frame having an end plate for contacting and sliding up and down inwardly facing surfaces on the associated vertical posts as it is raised and lowered relative to the associated vertical posts, wherein at least one of the end plates of the transverse support frame has a telescopic connection with the beams of the transverse support frame so that the effective length of the transverse support frame between the associated vertical posts can be varied to allow the frame system to be used in shipping containers with different transverse spacing between their respective longitudinally extending sides.

2. The frame system of claim 1, wherein the end plates have projecting spigots that extend telescopically into ends of the beams of the transverse support frame to allow adjustment of the effective length of the transverse support frame.

3. The frame system of claim 2, wherein the ends of the beams of the transverse support frame have internal cross webs adjacent the ends of the beams that limit the movement of the spigots into the beams of the transverse support frame to resist shock end loads applied via the end plates during use of the frame system.

4. The frame system of claim 2, wherein the ends of the beams of the transverse support frame that overlap the spigots on the end plates extend to locations adjacent the end plates so that at least a portion of condensation leaking from within the beams of the transverse support frame does not drip down onto a vehicle being carried in the shipping container at a position below the vehicle supported on the transverse support frame.

5. The frame system of claim 1, wherein the end plates have projecting sleeves that telescopically encircle ends of the beams of the transverse support frame to allow adjustment of the effective length of the transverse support frame.

6. The frame system of claim 1, wherein the telescopic connection is provided in a mid portion of the transverse support frame.

7. The frame system of claim 1, wherein fastening means are provided to secure the end plates in a fixed transverse position relative to each other.

8. The frame system of claim 7, wherein the fastening means comprises one or more nut and bolt fasteners that extend through and clamp together telescopically overlapping portions of the end plates and the beams of the transverse support frame.

9. The frame system of claim 1, wherein the end plates each include an array of bolt holes that can be aligned with bolt holes in the inwardly facing surfaces on the associated vertical post so that the transverse support frame can be fastened in a chosen position and held against rotation, vertical displacement and horizontal displacement, by inserting bolts through the aligned holes.

10. The frame system of claim 9, wherein, when the end plates of the transverse support frame are pinned to their associated vertical posts by a single bolt, wherein the transverse support frame can be rotated relative to the vertical posts by raising or lowering the transverse support frame so that the transverse support frame is rotated about the single bolt to adjust clearance between the transverse support frame and a vehicle below the transverse support frame, another bolt being inserted through aligned bolt holes in each end plate and its associated vertical post when the desired rotational position of the transverse support frame has been obtained.

11. The frame system of claim 1, wherein the attachment means for securing the top of each vertical post to the shipping container comprises ties of adjustable length that pull the top of each vertical post fore and aft relative to the longitudinally extending sides of the shipping container to locate the top of each vertical post.

12. The frame system of claim 11, wherein the attachment means for securing the bottom of each vertical post to the shipping container comprises ties of adjustable length that pull the bottom of each vertical post fore and aft relative to the longitudinally extending sides of the shipping container to locate the bottom of each vertical post.

13. The frame system of claim 11, wherein the attachment means for securing the bottom of each vertical post to the shipping container comprises a fixing plate through which fixing means attach the bottom of the vertical post to the floor of the shipping container.

14. The frame system of claim 1, wherein the transverse support frame and two associated ones of the vertical posts support front wheels of the vehicle within the shipping container; and
wherein the frame system further comprises an additional transverse support frame and two additional associated vertical posts that support rear wheels of the vehicle within the shipping container.

15. The frame system of claim 14, wherein the additional transverse support frame has two additional beams extending transversely across the shipping container from the one of the longitudinally extending sides of the shipping container to the another one of the longitudinally extending sides of the shipping container between which the rear wheels of the vehicle to be transported are supported;
wherein the additional beams are supported by the two additional associated vertical posts located one at each end of the additional transverse support frame;
wherein each of the two additional associated vertical posts are provided with attachment means for securing the top and bottom of the post to the shipping container at a plurality of locations along the length of the longitudinally extending sides of the shipping container;
wherein the additional transverse support frame when in the shipping container being raiseable relative to the two additional associated vertical posts with or without a vehicle loaded thereon and once raised being fixable to the two additional associated vertical posts at a chosen location for transport within the shipping container;
wherein each end of the additional transverse support frame having an end plate for contacting and sliding up and down inwardly facing surfaces on the additional associated vertical posts as it is raised and lowered relative to the additional associated vertical posts; and
wherein at least one of the end plates of the additional transverse support frame has a telescopic connection with the two additional beams of the additional transverse support frame so that the effective length of the additional transverse support frame between the two additional associated vertical posts can be varied to allow the frame system to be used in shipping containers with different transverse spacing between their respective longitudinally extending sides.

* * * * *